US010396622B2

United States Patent
Kanaya (10) Patent No.: US 10,396,622 B2
(45) Date of Patent: Aug. 27, 2019

(54) ELECTROMAGNETIC ACTUATOR AND ACTIVE VIBRATION-DAMPING DEVICE

(71) Applicant: SUMITOMO RIKO COMPANY LIMITED, Komaki-shi, Aichi (JP)

(72) Inventor: Tomohiro Kanaya, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 239 days.

(21) Appl. No.: 15/432,686

(22) Filed: Feb. 14, 2017

(65) Prior Publication Data

US 2017/0317552 A1 Nov. 2, 2017

(30) Foreign Application Priority Data

Apr. 28, 2016 (JP) .................... 2016-090717

(51) Int. Cl.
*H02K 5/24* (2006.01)
*H02K 1/34* (2006.01)
(Continued)

(52) U.S. Cl.
CPC ................ *H02K 5/24* (2013.01); *H02K 1/34* (2013.01); *H02K 3/04* (2013.01); *H02K 5/15* (2013.01);
(Continued)

(58) Field of Classification Search
CPC .. H02K 5/24; H02K 1/34; H02K 5/15; H02K 5/225
(Continued)

(56) References Cited

U.S. PATENT DOCUMENTS

2008/0060894 A1 3/2008 Koyama et al.
2011/0057367 A1 3/2011 Hasegawa et al.
(Continued)

FOREIGN PATENT DOCUMENTS

JP 2000-234645 A 8/2000
JP 2000-337427 A 12/2000
(Continued)

OTHER PUBLICATIONS

Nov. 1, 2018 Office Action issued in Chinese Patent Application No. 201710158032.8.
(Continued)

*Primary Examiner* — Terrance L Kenerly
(74) *Attorney, Agent, or Firm* — Oliff PLC (57) ABSTRACT

An electromagnetic actuator including: an outer tubular member and an inner axial member connected by an elastic member; a coil member attached to the outer tubular member generating electromagnetic force through energization thereto; a magnet member attached to the inner axial member and subjected to the electromagnetic force to exert axial driving force between the inner axial member and the outer tubular member; a first support section provided at the outer tubular member to axially clamp and securely support the coil member; a synthetic resin annular member housed within the outer tubular member including a power feed terminal to the coil member; and a second support section provided at the outer tubular member to axially clamp and securely support the annular member in such a parallel structure that clamping force by the first support section is not exerted on the second support section.

9 Claims, 1 Drawing Sheet (51) Int. Cl.
  H02K 3/04    (2006.01)
  H02K 5/15    (2006.01)
  H02K 5/22    (2006.01)
  H02K 7/00    (2006.01)
  H02K 33/16   (2006.01)
(52) U.S. Cl.
  CPC .......... H02K 5/225 (2013.01); H02K 7/003 (2013.01); H02K 33/16 (2013.01)
(58) Field of Classification Search
  USPC .......................................................... 310/43
  See application file for complete search history.

(56) References Cited

U.S. PATENT DOCUMENTS

| 2011/0180980 | A1* | 7/2011 | Urayama | F16F 7/1011 |
| | | | | 267/140.14 |
| 2014/0184065 | A1* | 7/2014 | Deery | E04H 4/1654 |
| | | | | 315/55 |
| 2016/0294240 | A1* | 10/2016 | Kawamoto | H02K 3/325 |

FOREIGN PATENT DOCUMENTS

| JP | 4643602 B2 | 3/2011 |
| JP | 2011-153692 A | 8/2011 |

OTHER PUBLICATIONS

Apr. 28, 2019 Office Action issued in Chinese Patent Application No. 201710158032.8.

* cited by examiner

ELECTROMAGNETIC ACTUATOR AND ACTIVE VIBRATION-DAMPING DEVICE

INCORPORATED BY REFERENCE

The disclosure of Japanese Patent Application No. 2016-090717 filed on Apr. 28, 2016 including the specification, drawings and abstract is incorporated herein by reference in its entirety.

BACKGROUND OF THE INVENTION

1. Field of the Invention

The present invention relates to an art concerning an electromagnetic actuator that generates axial electromagnetic driving force between an inner axial member and an outer tubular member and relates to the electromagnetic actuator and an active vibration-damping device using the same.

2. Description of the Related Art

Generally, for an active vibration damper or vibration-damping device, which is referred as an active type, the electromagnetic actuator is used in order to obtain oscillation force. The electromagnetic actuator, as shown in Japanese Patent No. JP-B-4643602 for example, has a structure wherein both axial side parts of an inner axial member are elastically supported in relation to an outer tubular member by elastic members and the inner axial member is assembled to be movable relative to the outer tubular member in the axial direction. The electromagnetic force exerted between a stator and a mover acts on the inner axial member and the outer tubular member, thereby providing axial oscillation force.

In the electromagnetic actuator disclosed in JP-B-4643602 mentioned above, the stator is constituted by including a coil member, while the mover is constituted by including a permanent magnet. Through energization in relation to the coil member, the electromagnetic force is generated between the stator and the mover. Therefore, the electromagnetic actuator disclosed in JP-B-4643602 includes a power feed terminal for supplying the coil member with electricity, and an annular member formed of a synthetic resin including the power feed terminal is housed within the outer tubular member.

Regarding the electromagnetic actuator, the internal space that stores a coil etc. is closed tight considering dust and water proof properties in many cases. In the electromagnetic actuator disclosed in JP-B-4643602 mentioned above, the outer peripheral end of the annular member is clamped by the outer tubular member and a bracket fitting from above and below, thereby keeping sealing of the internal space and fixing the annular member to the outer tubular member.

However, since a bobbin supporting the coil is directly fixed to the annular member, vibration of the stator relative to the mover readily travels to the outer peripheral end at which the annular member is supported. Especially, the annular member is formed of the insulative synthetic resin, which may be worn out or damaged. This might deteriorate fixation force for the annular member or affect adversely on vibration transmission from the target of vibration-damping to the housing via the annular member.

SUMMARY OF THE INVENTION

It is therefore one object of the present invention to provide an electromagnetic actuator and an active vibration-damping device of novel structure which are able to effectively avoid reduction of the fixation force for the annular member under the vibration between the mover and the stator.

The above and/or optional objects of this invention may be attained according to at least one of the following modes of the invention. The following modes and/or elements employed in each mode of the invention may be adopted at any possible optional combinations.

A first mode of the present invention provides an electromagnetic actuator comprising: an outer tubular member; an inner axial member; an elastic member connecting the outer tubular member and the inner axial member; a coil member attached to the outer tubular member, the coil member generating an electromagnetic force through energization thereto; a magnet member attached to the inner axial member, the magnet member being subjected to the electromagnetic force so as to exert an axial driving force between the inner axial member and the outer tubular member; a first support section provided at the outer tubular member to axially clamp and securely support the coil member; an annular member formed of a synthetic resin being housed within the outer tubular member, the annular member including a power feed terminal to the coil member; and a second support section provided at the outer tubular member to axially clamp and securely support the annular member, the second support section being provided in such a parallel structure that a clamping force by the first support section is not exerted on the second support section.

With the electromagnetic actuator constituted according to this mode, in the outer tubular member, the first support section fixing the coil member and the second support section fixing the annular member are provided substantially independently, thereby setting their clamping fixation force separately. Therefore, for example, it is also possible to keep large fixation force for the first support section on which the axial driving force caused between the magnet member and the coil member is exerted, while restraining the fixation force for the second support section to such a level as necessary for terminal connection, thereby avoiding problems, e.g., sinkage and damage of the resin.

A second mode of the present invention provides the electromagnetic actuator according to the first mode, further comprising an interposing seal rubber provided at at least one of a portion of the first support section of the outer tubular member for axially clamping and securely supporting the coil member, and a portion of the second support section of the outer tubular member for axially clamping and securely supporting the annular member.

For the electromagnetic actuator structured according to the present mode, by interposing the seal rubber, it is possible to moderate variability in the clamping fixation force caused by an error in member dimension or attachment position. Also, interposition of the seal rubber enables absorption of the clamping force, thereby avoiding unintentional excess of the clamping force.

A third mode of the present invention provides the electromagnetic actuator according to the first or second mode, further comprising: a terminal window formed in the outer tubular member; and a connecting part provided at the annular member including the power feed terminal, the connecting part being exposed to an outside through the terminal window, wherein a portion of the second support section that axially clamps and securely supports the annular member is provided on each axial side of the terminal window, and a ring-shaped seal rubber is provided at each support portion of the second support section located at each axial side of the annular member, so as to seal the terminal window.

The electromagnetic actuator constructed according to the present mode effectively avoids entry of debris like water and dust via the terminal window provided to dispose the power feed terminal. Especially by providing the ring-shaped seal rubber for the support portion located on each axial side of the annular member, it is possible to enjoy both buffering adjustment action of the clamping force for the annular member and sealing action by the outer tubular member.

A fourth mode of the present invention provides the electromagnetic actuator according to any one of the first to third modes, further comprising a first stepped part and a second stepped part provided at the outer tubular member as being separated from one another in an axial direction, the first stepped part constituting one axial support face of the first support section that axially clamps and supports the coil member, the second stepped part constituting one axial support face of the second support section that axially clamps and supports the annular member.

In the electromagnetic actuator structured according to the present mode, it is possible to efficiently form each one axial support face for the first support section and the second support section by the stepped shape provided at the outer tubular member.

A fifth mode of the present invention provides the electromagnetic actuator according to any one of the first to fourth modes, wherein the annular member is formed integrally with a bobbin having a coil wire wound therearound in the coil member.

With respect to the electromagnetic actuator constructed according to the present mode, the annular member including the power feed terminal and the coil bobbin have parts in common, thereby simplifying the structure. In addition, the energization line from the coil wire to the power feed terminal can be readily arranged by taking advantage of continuity between the bobbin and the annular member.

A sixth mode of the present invention provides the electromagnetic actuator according to any one of the first to fifth modes, wherein the coil member supported securely by the first support section and the annular member supported securely by the second support section are deviated in an axial direction.

In the electromagnetic actuator structured according to the present mode, it is possible to easily provide the outer tubular member with the first support section and the second support section. Besides, the axial deviation makes it easy to secure mutually-separate positioning parts by the outer tubular member for positioning each of the outer peripheral face of the coil member and the outer peripheral face of the annular member in the axis-perpendicular direction.

A seventh mode of the present invention provides the electromagnetic actuator according to any one of the first to sixth modes, further comprising a ring-shaped pressing member disposed on at least one axial side of the outer tubular member such that an outer peripheral rim of the pressing member is fixed to the outer tubular member, the pressing member protruding axially inward to constitute one axial support face of the first support section that supports the coil member by axially clamping the coil member.

With the electromagnetic actuator of the structure according to the present mode, use of this pressing member eliminates the need for diameter reduction of the opening of the outer tubular member, by providing it with a stepped coil member support portion, for example. Also, it is possible to broaden the opening of an end of the outer tubular member in order to facilitate visual check of the inside of the electromagnetic actuator during assembly of the components.

An eighth mode of the present invention provides the electromagnetic actuator according to the seventh mode, wherein the annular member is disposed on an outer peripheral side of the coil member, and an inner peripheral side portion of the pressing member constitutes the one axial support face of the first support section that clamps and supports the coil member, while an outer peripheral side portion of the pressing member constitutes one axial support face of the second support section that supports the annular member by axially clamping the annular member.

Regarding the electromagnetic actuator constituted according to the present mode, the first support section and the second support section have the pressing member in common, thereby reducing the number of the parts while simplifying the structure. Note that this mode can be used in combination with the aforesaid fourth mode, for example. By so doing, the first stepped part and the inner peripheral side portion of the pressing member can constitute the first support section, while the second stepped part and the outer peripheral side portion of the pressing member can constitute the second support section.

A ninth mode of the present invention provides an active vibration-damping device comprising: the electromagnetic actuator according to any one of the first to eighth modes; and an additional mass member provided for at least one axial end of the inner axial member.

For the actuator structured according to the present invention, the first support section that supports the coil member and the second support section that supports the annular member are provided to be mutually separated. Consequently, even if the vibration between the stator and the mover is exerted on the first support section, the vibration does not affect the support force for the annular member by the second support section. This makes it possible to stably keep the clamping of the annular member by the second support section.

BRIEF DESCRIPTION OF THE DRAWINGS

The foregoing and/or other objects, features and advantages of the invention will become more apparent from the following description of a preferred embodiment with reference to the accompanying drawing in which like reference numerals designate like elements and wherein.

DETAILED DESCRIPTION OF PREFERRED EMBODIMENTS

There will be described below the embodiment of the present invention while referring to the drawing.

Figure 1:
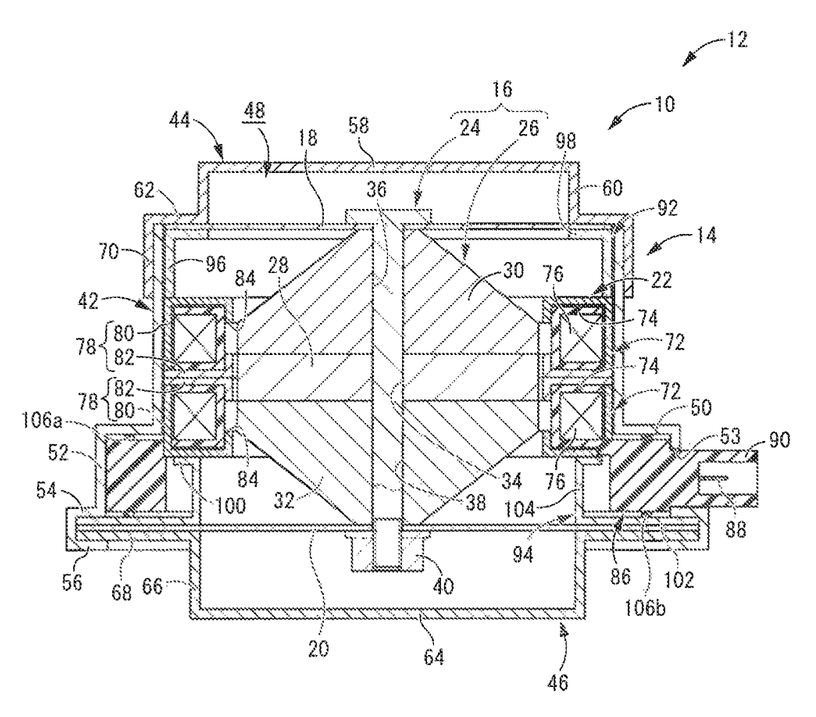
FIG. 1 is a longitudinal cross sectional view showing an active vibration-damping device using an electromagnetic actuator as a first embodiment of the present invention.

FIG. 1 shows an automotive active vibration-damping device 12 including an electromagnetic actuator 10 as a first embodiment of the present invention. With respect to this active vibration-damping device 12, an outer housing 14 is securely attached to an automotive body or the like, which is a member subject to vibration-damping and the primary vibration system. A mass member 16 is disposed to be housed within the outer housing 14 while being elastically linked thereto by plate springs 18, 20 as elastic members so as to constitute a mass-spring system, which is the secondary vibration system. A stator 22 is attached to the outer housing 14, while the mass member 16 is constituted by including an inner axial member 24 and a mover 26 as a magnet member, which is attached to the inner axial member 24. The mover 26 is disposed internally or externally in relation to the stator 22 such that the mover 26 is displaceable relative to the stator 22 in the axial direction. In explanation hereinafter, without special description, the up-down direction and the axial direction mean the up-down direction in FIG. 1, which is the direction in which the electromagnetic actuator 10 actuates and the input direction of the vibration to which the active vibration-damping effect by the active vibration-damping device 12 is exerted.

More specifically, the inner axial member 24 has a rod shape extending straight in the up-down direction. The mover 26 is securely assembled to the inner axial member 24.

The mover 26 is an armature in a structure wherein an upper yoke 30 and a lower yoke 32 as inner yokes are superposed to the respective upper-lower sides of a permanent magnet 28. In these permanent magnet 28 and upper and lower yokes 30, 32, through holes 34, 36, 38 are respectively formed extending on the central axes thereof in the axial direction. In the through holes 34, 36, 38, the inner axial member 24 is inserted. By a fastening nut 40 being threaded onto the inner axial member 24, a fastening force is exerted on the permanent magnet 28 and the upper and lower yokes 30, 32 in the overlap direction, thereby fixing them to the inner axial member 24.

The permanent magnet 28 constituting this mover 26 has a substantial shape of an annular plate with flat upper and lower surfaces expanding in the axis-perpendicular direction. The permanent magnet 28 is magnetized in the axial direction, thereby forming N and S magnetic poles on the respective upper and lower surfaces thereof. Note that, as the permanent magnet 28, although a ferrite based magnet and an alnico based magnet can be adopted, preferably adopted is a rare-earth cobalt based magnet.

Meanwhile, the upper and lower yokes 30, 32 are formed of a ferromagnet like iron, and it is possible to use the same material for each other. For the upper and lower yokes 30, 32, the overlap surfaces with the permanent magnet 28 have a flat surface shape corresponding to the permanent magnet 28, whereby the upper and lower yokes 30, 32 are superposed to the permanent magnet 28 with wide surfaces substantially in intimate contact thereagainst.

In this embodiment, the outermost peripheral parts of the upper and lower yokes 30, 32 are formed to have the outer diameter dimension roughly equal to that of the permanent magnet 28. By the magnetic poles set at the both axial end faces of this permanent magnet 28, the outer peripheral surfaces of the outermost peripheral parts of the upper and lower yokes 30, 32 are provided with the respective one of N and S magnetic poles.

To each axial end surface for the upper and lower yokes 30, 32, the plate springs 18, 20 are superposed, respectively. The inner axial member 24 pierces the plate springs 18, 20 on the central axes thereof, and each of the central portions of the plate springs 18, 20 is superposed and fixed to the respective one of the upper and lower yokes 30, 32.

With respect to the upper and lower yokes 30, 32, the outer peripheral surface has a shape whose diameter gets gradually smaller as it goes to the axial outside. This eliminates interfere with the plate springs 18, 20 when the upper and lower yokes 30, 32 are displaced in the axial direction.

On the other hand, the outer housing 14 has an outer tubular member 42 whose shape is substantially a large-diameter circular tube. This outer tubular member 42 is disposed co-axially with the inner axial member 24. To the upper and lower openings of the outer tubular member 42, a first lid member 44 and a second lid member 46 are superposed, respectively. The outer peripheral rims of these first and second lid members 44, 46 are fixed to the upper and lower openings of the outer tubular member 42, thereby constituting the outer housing 14 which includes a housing area 48 as a closed internal space therein.

The outer tubular member 42 has a larger diameter in the axially lower part. That is, in the outer tubular member 42, a step 50 as a second stepped part is formed to be located in the axially intermediate part, while a large diameter tube 52 is formed to extend downward from the outer peripheral rim of the step 50. Through a portion on the periphery of the large diameter tube 52 (on the right side in FIG. 1), a terminal window 53 is formed. Via the terminal window 53, the inside and outside of the large diameter tube 52 are communicated to each other. Formed at the lower end of the large diameter tube 52 is a flange 54 that is located in the lower opening of the outer tubular member 42. With the outer peripheral rim of the flange 54, a clinching part 56 is integrally formed as a clinching fixation piece with a circular tube shape protruding downward (to the side of the second lid member 46).

Each of the first and second lid members 44, 46, which are assembled on both axial sides of the outer tubular member 42, has a substantial shape of a bottomed, stepped tube, wherein the central portion is in a shape of an inverted bowl or a bowl that swells axially outward. This shape avoids interfere of the upper and lower plate springs 18, 20, while allowing axial displacement of the mover 26 within the outer housing 14.

Specifically, the first lid member 44 includes an upper base wall 58 in its center, and a tubular peripheral wall 60 formed extending downward from the outer peripheral rim of the upper base wall 58. From the lower edge of the peripheral wall 60, an upper flange part 62 extends and expands out in a ring shape to the outer peripheral side. On the other hand, the second lid member 46 includes a lower base wall 64 at its center and a tubular peripheral wall 66 formed extending upward from the outer peripheral rim of the lower base wall 64. From the upper edge of the peripheral wall 66, a lower flange part 68 extends and expands out in a ring shape to the outer peripheral side.

With the outer peripheral edge of the upper flange part 62 in the first lid member 44, a tubular part 70 is integrally formed in a circular tube shape protruding downward (to the side of the outer tubular member 42). Each inner face of the lid members 44, 46 may be covered with a thin rubber layer. For example, a stopper rubber can be formed at the central portion for the upper and lower base walls 58, 64 so as to limit axial displacement of the inner axial member 24 in cushioned fashion.

By means of inserting the upper end of the outer tubular member 42 in the tubular part 70 of the first lid member 44 in a press-fit state, and the like, the first lid member 44 is fixed to the upper end opening of the outer tubular member 42. Specifically, the first lid member 44 in a stepped shape is securely attached to the outer tubular member 42, and thus the upper flange part 62 of the first lid member 44 is a first stepped part provided at the outer tubular member 42. Consequently, the first stepped part (upper flange part) 62 and the second stepped part (step) 50 provided at the outer tubular member 42 are disposed with a prescribed separation distance in the axial direction. Meanwhile, the second lid member 46 is inserted in the clinching part 56 of the outer tubular member 42, and then the lower edge of the clinching part 56 is bent to the inner peripheral side, thereby fixing the second lid member 46 to the lower end opening of the outer tubular member 42.

In the housing area 48 of the outer housing 14 that is formed in this way, the stator 22 is housed within the outer tubular member 42. The stator 22, which has a substantial shape of a thick circular tube as a whole, is securely assembled to be positioned roughly at the central part in the axial direction of the outer tubular member 42 along the inner peripheral face thereof.

In details, the stator 22 includes two coil members 72, 72 which are arranged in the up-down direction. The coil members 72, 72 have a structure wherein outer yokes 78, 78 are assembled to coils 76, 76, which include bobbins 74, 74 formed of a resin and a conductive metal wire wound therearound. Accordingly, the whole shape of the coil member 72 is roughly a thick circular tube with a large diameter.

The outer yoke 78, which is formed of a ferromagnet like iron, includes a first yoke 80 that is overlapped with the coil 76 as covering it from the axial outer face to the outer peripheral face thereof and a second yoke 82 that is overlapped with the coil 76 as covering the axial inner face thereof.

All inner peripheral ends of the first yoke 80 and the second yoke 82 that are overlapped with the respective axial faces of the coil 76 extend in the axial direction from the respective up-down sides with their own prescribed lengths as covering the inner peripheral face of the coil 76. The ends of the first yoke 80 and the second yoke 82, which come close to one another from upside and downside in the axial direction on the inner peripheral face of the coil 76, face one another while being spaced apart therefrom with a prescribed distance in the axial direction.

Thus, around each of the upper and lower coils 76, 76, the outer yoke 78 including the first and second yokes 80, 82 forms a magnetic path, which guides magnetic flux generated through energization to the coils 76, 76. On this magnetic path, each of magnetic gaps 84, 84 is formed on the side of the inner peripheral faces of the coils 76, 76, between the opposite faces of the first yoke 80 and the second yoke 82 in the axial direction. These magnetic gaps 84, 84 expand continuously along the entire periphery in the peripheral direction with a substantially constant space.

Owing to power feed from the outside to the coils 76, 76, the magnetic flux is generated around the coils 76, 76 and guided by the magnetic path constituted by the outer yokes 78, 78. As a result, the magnetic poles are formed on both axial sides of the magnetic gaps 84, 84.

The axial distance between the upper and lower magnetic gaps 84, 84 in the stator 22 is substantially equal to the axial thickness dimension of the permanent magnet 28. The outer peripheral surfaces of the outermost peripheral parts of the upper and lower yokes 30, 32 where the magnetic poles are formed are disposed to face the magnetic gaps 84, 84 with a radial space in between.

By so doing, when a magnetic field is generated for the upper and lower magnetic gaps 84, 84 through the energization to the coils 76, 76 of the stator 22, an axial magnetic attractive force is exerted on the outermost peripheral part of one of the upper and lower yokes 30 (32), while an axial magnetic repulsive force is exerted on the outermost peripheral part of the other of the upper and lower yokes 32 (30). Based on the effect of these magnetic forces, a driving force to either axial side acts on the mover 26 depending on the energization direction to the coils 76, 76 of the stator 22. Control of interval and direction of the energization to the coils 76, 76 makes it possible to exert an axial oscillation force on the mover 26, and hence the inner axial member 24 by prescribed periods.

In this embodiment, for the coil 76 of the upper coil member 72 and the coil 76 of the lower coil member 72, the wires are wound around the bobbins 74, 74 in the adverse directions relative to each other, thereby generating magnetic flux in the adverse directions through the energization. The coils 76, 76 of the upper and lower coil members 72, 72 may be constituted by mutually continuous wires.

The stator 22 that has these coil members 72, 72 is assembled to the outer tubular member 42 such that the stator 22 is inserted in the outer tubular member 42 from below while the coil members 72, 72 are disposed in the axially intermediate part of the outer tubular member 42.

Here, the upper and lower coil members 72, 72 are substantially symmetrical and formed integrally with the bobbins 74, 74 in structure. Especially, with the lower bobbin 74, a power feed spacer 86 is integrally formed as an annular member so as to protrude to the outer peripheral side. This power feed spacer 86, which is in a large-diameter annular shape as a whole, is formed of a rigid synthetic resin, for example. Formed at a part on the periphery of the power feed spacer 86 is a connecting part 90 including a power feed terminal 88 for supplying the upper and lower coils 76, 76 with electricity from the outside.

The power feed spacer 86 is disposed in the large diameter tube 52 of the outer tubular member 42 such that the upper end face of the power feed spacer 86 is overlapped with the step 50 of the outer tubular member 42. The inner diameter dimension of the power feed spacer 86 is substantially equal to the outer diameter dimension for the coil members 72, 72, while the radial width dimension of the power feed spacer 86 is substantially equal to the radial width dimension of the step 50 of the outer tubular member 42 or slightly larger therethan. Consequently, the substantially whole power feed spacer 86 is housed in the large diameter part of the outer tubular member 42 on the outer peripheral side of the coil members 72, 72. Specifically, in the present embodiment, the coil members 72, 72 are disposed in the small diameter part located higher than the step 50 in the outer tubular member 42. Meanwhile, the power feed spacer 86 is disposed in the large diameter part located lower than the step 50 in the outer tubular member 42. Therefore, the coil members 72, 72 and the power feed spacer 86 are disposed within the outer tubular member 42 in positions deviated in the axial direction relative to each other.

Moreover, the connecting part 90 of the power feed spacer 86 is inserted through the terminal window 53 formed through the large diameter tube 52, so that the tip part of the connecting part 90 including the power feed terminal 88 protrudes on the outer peripheral face of the outer tubular member 42 to be exposed to the outside.

Furthermore, the stator 22 (the upper and lower coil members 72, 72) and the power feed spacer 86 of this structure are securely supported within the housing area 48 in a state of being clamped in the axial direction by a first pressing member 92 and a second pressing member 94.

The first pressing member 92, which has a substantially tubular shape as a whole, includes a straight shape part 96 that extends linearly in the up-down direction. At the upper end of the straight shape part 96, an inner flange part 98 is formed to bend peripherally inward and expand in a ring shape.

The outer diameter dimension of this first pressing member 92 is slightly smaller than the inner diameter dimension of the outer tubular member 42, and the first pressing member 92 is inserted in the upper opening of the outer tubular member 42. Then, the outer peripheral part of the plate spring 18 is superposed to the upper face of the inner flange part 98 of the first pressing member 92, and the first lid member 44 is assembled to them from above. In other words, the outer peripheral part of the plate spring 18 is clamped and supported by the upper flange part 62 of the first lid member 44 and the inner flange part 98 of the first pressing member 92 in the up-down direction.

The lower end of the straight shape part 96 of the first pressing member 92 is abutted to the upper end face of the upper coil member 72. Specifically, the upper end of the upper coil member 72 is superposed on the upper flange part 62 of the first lid member 44 via the first pressing member 92 and the plate spring 18. As a result, the movement of the stator 22 (the upper and lower coil members 72, 72) and the power feed spacer 86 to the upper side is limited by the first pressing member 92 as well as the upper flange part 62 of the first lid member 44.

Additionally, the second pressing member 94 is fitted into the outer tubular member 42 via the lower opening of the outer tubular member 42, so that the second pressing member 94 is securely assembled to the outer tubular member 42. The whole shape of the second pressing member 94 is substantially a circular tube having the axial length roughly equal to or slightly smaller than that of the large diameter tube 52 of the outer tubular member 42. In the second pressing member 94, the part located at the axially upper end is an annular pressing plate 100, while the part located at the axially lower end is an annular fixing plate 102. Besides, these pressing plate 100 and fixing plate 102 are connected to one another at their own inner peripheral ends by a tubular portion 104. The radial width dimension of the pressing plate 100 is smaller than that of the fixing plate 102, so that the pressing plate 100 is positioned on the inner peripheral side of the second pressing member 94 while the fixing plate 102 expands to the outer peripheral side of the pressing plate 100.

The upper end face of this second pressing member 94 is superposed on the lower end face of the lower coil member 72 in the stator 22 (the upper and lower coil members 72, 72). By so doing, the movement of the stator 22 (the upper and lower coil members 72, 72) and the power feed spacer 86 to the lower side is limited by the pressing plate 100 of the second pressing member 94. In short, the upper and lower coil members 72, 72 are superposed to the upper flange part 62 of the first lid member 44 via the first pressing member 92 in the upper side, while they are superposed to the pressing plate 100 of the second pressing member 94 in the lower side. Therefore, the upper flange part 62 of the first lid member 44 and the pressing plate 100 of the second pressing member 94 constitute a first support section, which axially clamps and securely supports the coil members 72, 72, wherein each of the upper flange part 62 and the pressing plate 100 is a support portion supporting the coil members 72, 72. Thus, in the present embodiment, the lower end face of a first stepped part (the upper flange part) 62 constitutes one axial support face of the first support section that axially clamps and supports the coil members 72, 72. On the other hand, the upper end face of the pressing plate 100 constitutes the other axial support face of the first support section.

Meanwhile, the fixing plate 102 of the second pressing member 94 is superposed to the flange 54 of the outer tubular member 42 at its outer peripheral rim. By the clinching part 56 of the outer tubular member 42, the fixing plate 102 is fixed by clinching to the flange 54 together with the lower flange part 68 of the second lid member 46 and the outer peripheral rim of the plate spring 20.

By the second pressing member 94 being assembled to the lower opening of the outer tubular member 42 like this, the second pressing member 94 is disposed protruding to the inner peripheral side in the outer tubular member 42. The power feed spacer 86 is disposed between the tubular portion 104 of the second pressing member 94 and the large diameter tube 52 of the outer tubular member 42 in the radial direction. The lower face of the power feed spacer 86 is superposed on the upper face of the fixing plate 102 on the outer peripheral side of the pressing plate 100 in the second pressing member 94.

Specifically, for the power feed spacer 86, the upper face is superposed on the lower face of the step 50 of the outer tubular member 42, while the lower face is superposed on the upper face of the fixing plate 102. Hence, a second support section that axially clamps and securely supports the power feed spacer 86 is constituted by the step 50 of the outer tubular member 42 and the fixing plate 102 of the second pressing member 94. Each of the step 50 and the fixing plate 102 is a support portion which supports the power feed spacer 86. Therefore, in this embodiment, the lower face of the second stepped part (step) 50 constitutes one axial support face of the second support section that axially clamps and supports the power feed spacer 86. On the other hand, the upper face of the fixing plate 102 constitutes the other axial support face of the second support section.

As has been described above, for the present embodiment, the first support section supporting the coil members 72, 72 in the axial direction is constituted by including the upper flange part 62 and the pressing plate 100, while the second support section is constituted by including the step 50 and the fixing plate 102. More specifically, the outer tubular member 42 within which the coil members 72, 72 are attached is assembled with the first and second pressing members 92, 94 and the first and second lid members 44, 46. As a result, the outer tubular member 42 is provided with the first support section fixedly supporting the coil members 72, 72 by clamping them in the axial direction, and the second support section securely supporting the annular member in the form of the power feed spacer 86 by clamping it in the axial direction. Here, the portion of the fixing plate 102 that supports the power feed spacer 86 is positioned on the outer peripheral side of the pressing plate 100, i.e., the second support section is positioned on the outer peripheral side of the first support section. Therefore, the clamping force of the first support section clamping the coil members 72, 72 and the clamping force of the second support section clamping the power feed spacer 86 are mutually separate, and these clamping forces are not exerted on each other. That is, the first support section and the second support section are provided in a parallel arrangement.

In the portions of the second support section that clamp the power feed spacer 86 in the axial direction, seal rubbers 106a, 106b are interposed. That is, for the present embodiment, on the lower face of the step 50 of the outer tubular member 42 and the upper face of the fixing plate 102 of the second pressing member 94, ring-shaped seal rubbers 106a, 106b are fixed. Alternatively, these seal rubbers 106a, 106b may be fixed on the upper and lower faces of the power feed spacer 86.

The terminal window 53 through which the connecting part 90 extending out from the power feed spacer 86 is inserted is located between the step 50 of the outer tubular member 42 and the fixing plate 102 of the second pressing member 94 in the axial direction. In other words, the step 50 and the fixing plate 102 are positioned on both axial sides of the terminal window 53. On the both axial sides of the terminal window 53, the gap between the step 50 and the power feed spacer 86 and the gap between the fixing plate 102 and the power feed spacer 86 are sealed with the seal rubbers 106*a*, 106*b*, thereby sealing the terminal window 53 so as to close the housing area 48 tightly.

It is also possible to fix the same seal rubber on the portions of the first support section clamping the coil members 72, 72, i.e., the lower face of the first pressing member 92 and the upper face of the pressing plate 100 of the second pressing member 94, or the upper and lower faces of the upper and lower coil members 72, 72. Moreover, it is possible as well to provide the same seal rubber between the outer tubular member 42 and the coil members 72, 72 in the radial direction.

The outer peripheral rims of the upper and lower plate springs 18, 20 are fixed to the outer housing 14 of the aforementioned structure. By so doing, the inner axial member 24 including the mover 26 is elastically supported in the proximity of both axial ends via the plate springs 18, 20 by the outer housing 14. The length dimension of the inner axial member 24 is shorter than the axial dimension between the opposite faces of the first and second lid members 44, 46, so that the whole inner axial member 24 is housed within the housing area 48. In the plate springs 18, 20, a plurality of through windows are formed extending in a spiral form. The through windows secure large spring rigidity in the axis-perpendicular direction and adjust spring characteristics in the axial direction.

In this embodiment, by the elasticity of the upper and lower plate springs 18, 20, the mover 26 is retained in the initial axial position relative to the stator 22 such that the mover 26 rapidly comes back to the initial position when the driving force through the energization from the outside is cancelled.

The electromagnetic actuator 10 of this structure constitutes the active vibration-damping device 12, by the outer tubular member 42 of the outer housing 14 being securely attached to a member subject to vibration-damping of the primary vibration system, via a not-shown attachment part or an attachment part constituted by one portion of the outer tubular member 42. In an attachment state, the power feed to the coils 76, 76 of the stator 22 is controlled depending on the axial vibration subject to damping. Thus, the mover 26 and the inner axial member 24 constituting the secondary vibration system are oscillated in the axial direction relative to the stator 22 and the outer housing 14 to obtain the target vibration-damping effect.

In the electromagnetic actuator 10 of the aforesaid structure, the first support section supporting the coil members 72, 72 and the second support section supporting the power feed spacer 86 are provided to be mutually separate. Therefore, when an axial oscillation force is generated between the mover 26 and the stator 22 accompanying the energization to the coils 76, 76, the force exerted to the first support section is not exerted to the second support section. With respect to assembly of the stator 22 and the power feed spacer 86 to the outer tubular member 42, it is possible as well to assemble the coil members 72, 72 with comparatively large fixation force in the first support section, while assembling the power feed spacer 86 with comparatively small fixation force in the second support section. This effectively avoids sinkage and damage of the power feed spacer 86 formed of a synthetic resin, thereby stably retaining the fixation force for the stator 22 and the power feed spacer 86.

Especially for this embodiment, the outer tubular member 42 is provided with the first stepped part (upper flange part) 62 and the second stepped part (step) 50, and the first and second pressing members 92, 94 are adopted. Consequently, the coil members 72, 72 and the power feed spacer 86 can be skillfully clamped between these stepped parts 62, 50 and pressing members 92, 94. This enables provision of the aforementioned first support section and second support section with a simple structure.

In the portion of the second support section supporting the power feed spacer 86, the seal rubbers 106*a*, 106*b* are provided. This allows the seal rubbers 106*a*, 106*b* to absorb and reduce accordingly the force exerted on the power feed spacer 86. Provision of these seal rubbers 106*a*, 106*b* secures the sealing of the housing area 48, thereby effectively avoiding entry of such debris as water and dust.

For this embodiment, the bobbins 74, 74, which constitute the upper and lower coil members 72, 72, and the power feed spacer 86 are integrally formed. This can simplify the structure and avoid increase of the number of parts.

Besides, in the present embodiment, the coil members 72, 72 and the power feed spacer 86 are disposed to be deviated in the axial direction. This makes it possible to separately provide the part of the outer tubular member 42 that abuts the outer peripheral faces of the coil members 72, 72 and the part of the outer tubular member 42 that abuts the outer peripheral face of the power feed spacer 86. As a result, positioning effect in the axis-perpendicular direction for the coil members 72, 72 and the power feed spacer 86 can be also stably exhibited.

There has been described the embodiment of the present invention. However, the present invention is not limited by the specific description of the embodiment. For example, the coil members constituting the stator are not limited to the two coil members overlapped in the up-down direction. That is, it is also possible to provide only one coil member, or to provide three or more coil members overlapped in the axial direction. Besides, with respect to the upper and lower coil members 72, 72 in the aforesaid embodiment, the coils 76, 76 wound in the adverse directions relative to each other are adopted, but it is also possible to use upper and lower coils wound in the same direction.

Regarding the mover as well, it is possible to adopt various structures to generate axial driving force using magnetic effect caused through the energization to the coil members, depending on the employed structure of the stator. For example, it is also possible to set magnetic poles in multiple steps by overlapping the permanent magnets and the yokes mutually in multiple steps. Additionally, the permanent magnet is not indispensable, and it is possible as well to use a structure for which the mover formed of a ferromagnetic material is adopted and an axial driving force is generated using a magnetic absorptive force in relation to the magnetic poles formed in the coil members.

In the aforementioned embodiment, the coil members 72, 72 are disposed on the side of the stator 22, while the permanent magnet 28 is disposed on the side of the mover 26. To the contrary, it is also possible to dispose the coil members on the side of the mover, while disposing the permanent magnet on the side of the stator. This structure can be realized for example by using the features shown in Japanese Unexamined Patent Publication No. JP-A-2000-234645.

In the above-described embodiment, the mover 26 (the permanent magnet 28 and the upper and lower yokes 30, 32) and the inner axial member 24 are used as the mass member 16 of the secondary vibration system. However, it is also possible to have the inner axial member protruding axially outward and mount an additional mass to the protruding tip of the inner axial member, as disclosed in U.S. Publication No. US 2011/057367 (incorporated herein by reference). Moreover, it is also possible to use an additional spring constituted by a rubber elastic body etc. that elastically links the inner axial member and the outer tubular member to one another, in addition to the upper and lower plate springs, as disclosed in the same Publication.

Furthermore, shown as an example in the aforementioned embodiment is the embodiment wherein the electromagnetic actuator 10 structured according to the present invention is applied to the active vibration-damping device 12. However, it is possible as well to apply it to an active vibration-damping device used as an engine mount or a body mount for example. Specifically, the electromagnetic actuator 10 described above can be used as an actuator of the known active vibration-damping device disclosed in Japanese Unexamined Patent Publication No. JP-A-2000-337427, for example. That is, the main body of this fluid-filled vibration-damping device includes a fluid chamber with a non-compressible fluid or liquid sealed therein, and the wall of this fluid chamber is partially constituted by an oscillation member that exerts pressure fluctuation. Therefore, in the electromagnetic actuator 10 disclosed in the above-mentioned embodiment, the outer housing 14 may be fixed to the attachment member of the fluid-filled vibration-damping device so that the axial oscillation force exerted on the inner axial member 24 can be applied to the oscillation member of the fluid-filled vibration-damping device, for example. More specifically, in the electromagnetic actuator 10 disclosed in the above-described embodiment, it is possible for example to use an output member provided integrally with the inner axial member 24 that extends in the axial direction. This output member can protrude axially outward through the first lid member 44 of the outer housing 14 to bring the driving force out to the outside, thereby oscillating the oscillation member of the fluid-filled vibration-damping device main body.

For the aforesaid embodiment, in the outer tubular member 42, the coil members 72, 72 and the power feed spacer 86 are positioned to be deviated in the axial direction, but they can be partially deviated or entirely overlapped in the axial direction.

In the above-described embodiment, the seal rubbers 106a, 106b are provided in the second support section at both axial sides of the power feed spacer 86.

However, the seal rubber may be provided at only one axial side thereof. Note that this seal rubber is dispensable in the present invention.

Besides, in the aforementioned embodiment, the outer tubular member 42 has a tubular shape opening on both axial sides. However, the outer tubular member can have a bottomed tubular shape like a cup shape including a bottom wall that obstructs one axial opening, for example.

In addition to them all, other embodiments including various changes, amendments, modifications and the like on the basis of the knowledge of the skilled person, which are not recited one by one, can be used to realize the present invention.

As long as these embodiments do not deviate from the concept of this invention, they are all included in the range of the present invention.

What is claimed is:

1. An electromagnetic actuator comprising:
   an outer tubular member;
   an inner axial member;
   an elastic member connecting the outer tubular member and the inner axial member;
   a coil member attached to the outer tubular member, the coil member generating an electromagnetic force through energization thereto;
   a magnet member attached to the inner axial member, the magnet member being subjected to the electromagnetic force so as to exert a driving force in an axial direction of the inner axial member between the inner axial member and the outer tubular member;
   a first support section provided at the outer tubular member, the first support section including a first axial support face and a second axial support face which are spaced apart from each other in the axial direction, and the coil member is clamped by the first axial support face and the second axial support face in the axial direction so as to securely support the coil member;
   an annular member formed of a synthetic resin being housed within the outer tubular member, the annular member including a power feed terminal to the coil member; and
   a second support section provided at the outer tubular member, the second support section including a third axial support face and a fourth axial support face which are spaced apart from each other in the axial direction, and the annular member is clamped by the third axial support face and the fourth axial support face in the axial direction so as to securely support the annular member, wherein
   the second support section is positioned on an outer peripheral side of the first support section so that the second support section is provided in such a parallel structure that a clamping force by the first support section is not exerted on the second support section.

2. The electromagnetic actuator according to claim 1, further comprising an interposing seal rubber provided at at least one of a portion of the first support section of the outer tubular member for axially clamping and securely supporting the coil member, and a portion of the second support section of the outer tubular member for axially clamping and securely supporting the annular member.

3. An electromagnetic actuator comprising:
   an outer tubular member;
   an inner axial member;
   an elastic member connecting the outer tubular member and the inner axial member;
   a coil member attached to the outer tubular member, the coil member generating an electromagnetic force through energization thereto;
   a magnet member attached to the inner axial member, the magnet member being subjected to the electromagnetic force so as to exert an axial driving force between the inner axial member and the outer tubular member;
   a first support section provided at the outer tubular member to axially clamp and securely support the coil member;
   an annular member formed of a synthetic resin being housed within the outer tubular member, the annular member including a power feed terminal to the coil member;
   a second support section provided at the outer tubular member to axially clamp and securely support the annular member, the second support section being provided in such a parallel structure that a clamping force by the first support section is not exerted on the second support section;

a terminal window formed in the outer tubular member; and a connecting part provided at the annular member including the power feed terminal, the connecting part being exposed to an outside through the terminal window, wherein a portion of the second support section that axially clamps and securely supports the annular member is provided on each axial side of the terminal window, and a ring-shaped seal rubber is provided at each support portion of the second support section located at each axial side of the annular member, so as to seal the terminal window.

4. The electromagnetic actuator according to claim 1, further comprising a first stepped part and a second stepped part provided at the outer tubular member as being separated from one another in the axial direction, the first stepped part constituting the first axial support face of the first support section that axially clamps and supports the coil member, the second stepped part constituting the third axial support face of the second support section that axially clamps and supports the annular member.

5. The electromagnetic actuator according to claim 1, wherein the annular member is formed integrally with a bobbin having a coil wire wound therearound in the coil member.

6. The electromagnetic actuator according to claim 1, wherein the coil member supported securely by the first support section and the annular member supported securely by the second support section are deviated in the axial direction.

7. An electromagnetic actuator comprising:
an outer tubular member;
an inner axial member;
an elastic member connecting the outer tubular member and the inner axial member;
a coil member attached to the outer tubular member, the coil member generating an electromagnetic force through energization thereto;
a magnet member attached to the inner axial member, the magnet member being subjected to the electromagnetic force so as to exert an axial driving force between the inner axial member and the outer tubular member;
a first support section provided at the outer tubular member to axially clamp and securely support the coil member;
an annular member formed of a synthetic resin being housed within the outer tubular member, the annular member including a power feed terminal to the coil member;
a second support section provided at the outer tubular member to axially clamp and securely support the annular member, the second support section being provided in such a parallel structure that a clamping force by the first support section is not exerted on the second support section; and
a ring-shaped pressing member disposed on at least one axial side of the outer tubular member such that an outer peripheral rim of the pressing member is fixed to the outer tubular member, the pressing member protruding axially inward to constitute one axial support face of the first support section that supports the coil member by axially clamping the coil member.

8. The electromagnetic actuator according to claim 7, wherein the annular member is disposed on an outer peripheral side of the coil member, and an inner peripheral side portion of the pressing member constitutes the one axial support face of the first support section that clamps and supports the coil member, while an outer peripheral side portion of the pressing member constitutes one axial support face of the second support section that supports the annular member by axially clamping the annular member.

9. An active vibration-damping device comprising:
the electromagnetic actuator according to claim 1; and
an additional mass member provided for at least one axial end of the inner axial member.

\* \* \* \* \*

UNITED STATES PATENT AND TRADEMARK OFFICE
CERTIFICATE OF CORRECTION

| | | |
|---|---|---|
| PATENT NO. | : 10,396,622 B2 | |
| APPLICATION NO. | : 15/432686 | |
| DATED | : August 27, 2019 | |
| INVENTOR(S) | : Tomohiro Kanaya | |

It is certified that error appears in the above-identified patent and that said Letters Patent is hereby corrected as shown below:

On the Title Page

Item (12) delete "Kanaya" and insert -- Kanaya et al. --; and
Item (72) should read as follows:
(72) Inventors: Tomohiro KANAYA, Komaki (JP); Takaaki SHIMIZU, Tokyo (JP); Yasunori KOBAYASHI, Tokyo (JP)

Signed and Sealed this
Seventh Day of June, 2022

Katherine Kelly Vidal
*Director of the United States Patent and Trademark Office*